United States Patent [19]

Heinrichs et al.

[11] Patent Number: 5,538,931
[45] Date of Patent: Jul. 23, 1996

[54] TRANSITION METAL AEROGEL-SUPPORTED CATALYST

[75] Inventors: Benoît Heinrichs; Jean-Paul Pirard; René Pirard, all of Liège, Belgium

[73] Assignee: Solvay Deutschland GmbH, Hanover, Germany

[21] Appl. No.: 258,627

[22] Filed: Jun. 10, 1994

[30] Foreign Application Priority Data

Jun. 16, 1993 [DE] Germany .................. 43 19 909.7

[51] Int. Cl.⁶ .................. B01J 21/08; B01J 21/12
[52] U.S. Cl. .................. 502/234; 502/235; 502/236; 502/237; 502/238; 502/239; 502/244; 502/245; 502/259; 502/260; 502/262
[58] Field of Search .................. 502/234, 235, 502/236, 237, 238, 239, 244, 245, 259, 260, 262

[56] References Cited

U.S. PATENT DOCUMENTS

| | | | |
|---|---|---|---|
| 2,093,454 | 9/1937 | Kistler . | |
| 3,867,278 | 2/1975 | Olson | 502/239 |
| 3,977,993 | 8/1976 | Lynch | 502/237 |
| 3,978,001 | 8/1976 | Meyer | 502/235 |
| 4,006,175 | 2/1977 | Termin et al. . | |
| 4,176,089 | 11/1979 | Cull . | |
| 4,422,960 | 12/1983 | Shiroto et al. | 502/236 |
| 4,432,956 | 2/1984 | Zarzycki et al. . | |
| 4,547,557 | 10/1985 | McDaniel | 502/236 |
| 4,619,908 | 10/1986 | Cheng et al. | 502/235 |
| 4,717,708 | 1/1988 | Cheng et al. | 502/235 |
| 4,894,357 | 1/1990 | Hupe et al. | 502/239 |
| 5,073,531 | 12/1991 | Witt | 502/234 |
| 5,434,118 | 7/1995 | Carati et al. | 502/234 |
| 5,444,032 | 8/1995 | Perego et al. | 502/235 |

FOREIGN PATENT DOCUMENTS

| | | |
|---|---|---|
| 067741 | 12/1982 | European Pat. Off. . |
| 117324 | 9/1986 | European Pat. Off. . |
| 492697 | 7/1992 | European Pat. Off. . |
| 590714 | 4/1994 | European Pat. Off. . |
| 4002287 | 9/1990 | Germany . |
| WO93/06926 | 4/1993 | WIPO . |

OTHER PUBLICATIONS

*Handbook of Chemistry and Physics*, 40 Ed., Chemical Rubber Publishing Company, Cleveland, pp. 2302–2304.
Gardes et al., *J. Catalysis*, 33:145–48 (1974).
Armor et al., *Appl. Catalysis*, 19:327–37 (1985).
Armor et al., *Appl. Catalysis*, 19:339–48 (1985).
Pajonk et al., *Springer Proc. Phys. 6 (Aerogels)*, pp. 193–199 (1986).
Lopez, *Acta Cientifica Venezolana*, 37:274–77 (1986).
Khatib et al., *J. Organometallic Chem.*, 369:9–16 (1989).
Pajonk, *Appl. Catalysis*, 72:217–66 (1991).

*Primary Examiner*—Wayne Langel
*Attorney, Agent, or Firm*—Evenson, McKeown, Edwards & Lenahan

[57] ABSTRACT

A process for preparing a supported catalyst comprising a transition metal selected from palladium, platinum, nickel, cobalt or copper on an aerogel support, which includes the steps of providing a mixture containing an alkoxide precursor of the aerogel, a chelate complex of the transition metal with a chelating agent having $Si(OR)_3$ anchor groups, and an organic solvent in which the chelate complex is soluble; hydrolyzing the mixture by admixing it with water to form a gel; and converting the gel under supercritical conditions into the transition metal aerogel-supported catalyst. The supported catalyst has an especially homogeneous distribution of the metal component and is suitable, for example, for use as a hydrogenation catalyst.

10 Claims, No Drawings

TRANSITION METAL AEROGEL-SUPPORTED CATALYST

BACKGROUND OF THE INVENTION

The present invention relates to a process for preparing an aerogel composed of inorganic oxides and comprising palladium, platinum, nickel, cobalt and/or copper; to homogeneously constructed, aerogel-supported transition metal catalysts produced in accordance with the process of the invention; and also to methods of using such catalysts.

Aerogel-supported metal catalysts are described by G. M. Pajonk in a review article in *Appl. Catalysis*, 72 (1991), pages 217 to 266. They are suitable for various purposes. $Pt/SiO_2$ aerogel catalysts, for example, catalyze the oxidation of $CH_3CHO$ to $CH_3COOH$. $Ni/SiO_2$ aerogel catalysts catalyze the hydrogenation of toluene to methylcyclohexane. $Cu/Al_2O_3$ aerogel catalysts catalyze the hydrogenation of cyclopentadiene to cyclopentene.

In *Appl. Catalysis*, 19 (1985), pages 339-348, the authors J. N. Armor, E. J. Carlson and P.M. Zambri describe the preparation of palladium/aluminum oxide aerogel-supported catalysts. These catalysts are suitable for the hydrogenation of nitrobenzene to aniline.

In *Appl. Catalysis*, 19 (1985), pages 327-337, the authors J. N. Armor and E. J. Carlson describe supported catalysts, namely palladium on aluminum oxide aerogel and also palladium on silicon dioxide aerogel in encapsulated form. Specific application purposes for these preparations are not indicated. However, from the context it appears that such preparations have a catalytic activity which is not more closely defined. In order to incorporate the palladium in the gel, a solution of palladium(II) acetate in warm acetone is prepared and mixed with the alkoxide precursors and an organic solvent. A problem here is that palladium(II) acetate is not readily soluble in alcohols. For this reason, in the preparation of the palladium aerogel-supported catalysts, inhomogeneous regions in the supported catalysts have to be expected.

SUMMARY OF THE INVENTION

It is the object of the present invention to provide an improved process for producing aerogel-supported transition metal catalysts.

A further object of the invention is to provide a process for producing aerogel-supported transition metal catalysts in which the transition metal is particularly homogeneously distributed in the support material.

Another object of the invention is to provide aerogel-supported transition metal catalysts having a more uniform distribution of the transition metal in the support material.

These and other objects of the invention are achieved by providing a process for preparing an inorganic oxide aerogel containing at least one transition metal selected from the group consisting of palladium, platinum, nickel, cobalt and copper, comprising the steps of forming a mixture comprising an alkoxide precursor of the inorganic oxide, an organometal compound of said at least one transition metal, and an organic solvent; hydrolyzing the mixture with water to form a gel; and converting the gel under supercritical conditions into an aerogel, whereby the transition metal is homogeneously distributed in said aerogel; wherein the organometal compound is a chelate complex of the at least one transition metal with a chelating agent comprising $Si(OR^1)_3$ anchor groups in which $R^1$ represents an alkyl group containing from 1 to 8 carbon atoms, and wherein the chelate complex is soluble in the organic solvent.

In accordance with a further aspect of the invention, the objects are also achieved by providing a supported transition metal catalyst consisting of an inorganic oxide aerogel support having a transition metal selected from the group consisting of platinum, nickel, cobalt and copper homogeneously distributed therein, produced by a process comprising the steps of forming a mixture comprising an alkoxide precursor of the inorganic oxide, a chelate complex of the at least one transition metal with a chelating agent comprising $Si(OR^1)_3$ anchor groups in which $R^1$ represents an alkyl group containing from 1 to 8 carbon atoms, and an organic solvent in which the chelate complex is soluble; hydrolyzing the mixture with water to form a gel; and converting the gel under supercritical conditions into an aerogel.

DETAILED DESCRIPTION OF PREFERRED EMBODIMENTS

The process of the invention for the preparation of an aerogel based on inorganic oxides and comprising a transition metal selected from among palladium, platinum, nickel, cobalt and copper, an alkoxide precursor of the inorganic oxide and also an organic palladium, platinum, nickel, cobalt and/or copper compound being mixed with an organic solvent, the precursor being hydrolyzed and the resulting gel being converted under supercritical conditions into an aerogel comprising the transition metal, is characterized in that the transition metal is used in the form of a chelate complex, which is soluble in the organic solvent with a chelating agent having $Si(OR^1)_3$ anchor groups, where $R^1$ is alkyl having from 1 to 8 carbon atoms. The chelating agent may comprise one or more anchor groups. The complex comprises conventional inorganic or organic anions, preferably acetylacetonate. It is important for the process of the invention that the chelate complex of palladium, platinum, nickel, cobalt or-copper which is used be soluble in the organic solvent which is used. The solubility of a given chelate complex (for example, a complex between palladium$^{2+}$ and the chelating agent having $Si(OR^1)_3$ anchor groups) in an intended solvent can be readily determined by persons of ordinary skill in the art through simple experiments.

If desired, one or more additional alkoxide precursors of base metal oxides can be additionally used and hydrolyzed. Mixed inorganic oxides are then formed.

Preferred organic solvents are alcohols having from 1 to 4 carbon atoms. Alcohols having from 1 to 3 carbon atoms are particularly preferred. It is also possible to use liquid carbon dioxide as the solvent. Other suitable solvents include lower-alkyl monoethers of glycol, for example glycol monomethyl ether.

It is within the scope of the invention to prepare aerogel-supported catalysts which contain only a single transition metal or to prepare aerogel-supported catalysts which contain two or more of the recited transition metals.

Preferred chelate complexes are those with diamine compounds. Such diamine chelating agents comprise two primary, secondary or tertiary amino groups and also the $Si(OR^1)_3$ anchor group or groups mentioned.

It is preferred to use chelate complexes of $Pt^{2+}$, $Ni^{2+}$, $Co^{2+}$, $Cu^{2+}$ and particularly $Pd^{2+}$ with a compound of the formula (I)

$$R^2R^3N-(CHR^4)_a-N(R^5)-(CHR^6)_b-Si(OR^1)_3 \quad (I),$$

where $R^1$ has the above meaning, $R^2$ and $R^3$ can be identical or different and are hydrogen, alkyl having from 1 to 4 carbon atoms, phenyl or phenyl substituted by 1 or more C1 or C2 alkyl groups, $R^4$ and $R^5$ are identical or different and are hydrogen or alkyl having from 1 to 4 carbon atoms, $R^6$ is hydrogen or alkyl having from 1 to 6 carbon atoms, a is an integer from 1 to 4, and b is an integer from 1 to 8. The preferred anion is acetylacetonate.

It is particularly preferred to use a compound corresponding to the general formula (I), where $R^1$ is alkyl having from 1 to 4 carbon atoms, $R^2$, $R^3$, $R^4$ and $R^5$ can be identical or different and are, independently of one another, hydrogen, methyl or ethyl, $R^6$ is hydrogen or alkyl having from 1 to 4 carbon atoms, a is an integer from 1 to 3, and b is an integer from 1 to 4.

Chelate complexes of $Pt^{2+}$, $Ni^{2+}$, $Co^{2+}$, $Cu^{2+}$ and especially of $Pd^{2+}$ with N-[3-(trimethoxysilyl)propyl]-1,2-ethanediamine, N-[3-(triethoxysilyl)propyl]-1,2-ethanediamine and N-[3-(tripropoxysilyl)propyl]-1,2-ethanediamine are particularly suitable.

The invention will be described in further detail with reference to a preferred embodiment relating to the preparation of aerogel-supported palladium catalysts. It should be understood, however, that this description is merely a representative illustration, and that the scope of the invention is not limited to the particular materials described.

All those inorganic oxides which are known to be obtained as aerogels by hydrolysis of the corresponding alkoxide precursor and conversion of the resulting gel under supercritical conditions can, according to the process of the invention, be used to prepare a palladium-comprising aerogel. For example, supported palladium catalysts can be prepared in which the support comprises an aerogel composed of $SiO_2$, $Al_2O_3$, $ZrO_2$, $TiO_2$, or mixtures of two or more of the aforementioned oxides. It should also be noted that even in aluminum, zirconium, titanium and other oxides there is always present, homogeneously distributed, that amount of $SiO_2$ which is derived from the chelate complex containing $Si(OR^1)_3$ anchor groups. Palladium-containing supported catalysts formed of $SiO_2$, $Al_2O_3$ and/or $ZrO_2$ (the last two having a homogeneously distributed $SiO_2$ content resulting from the process) are particularly preferred.

The alkoxide precursors (i.e. the precursors of the inorganic oxides in the form of alkoxides of the metal or non-metal on which the oxide is based) which are used, advantageously comprise alkoxides containing C1–C6 alkoxy groups. Alkoxides containing C1–C4 alkoxy groups are preferred, especially alkoxides which contain $CH_3O-$, $C_2H_5O-$, $C_3H_7O-$ or sec-$C_4H_9O$-groups.

Particularly suitable alkoxide precursors include tetraethoxysilane, aluminum sec-butoxide [$Al(OC_4H_9)_3$], and zirconium propoxide [$Zr(OC_3H_7)_4$].

As previously mentioned, the conversion process is carried out under supercritical conditions with regard to the organic solvent. The necessary critical constants can be found in known reference volumes, for example from the Handbook of Chemistry and Physics, 40th Edition (1958), pages 2302 to 2304. The critical temperature and pressure of carbon dioxide, for example, are 31.1° C. and 73.0 atm, for methanol 240° C. and 78.7 atm, for ethyl alcohol 243.1° C. and 63.1 arm, for n-propyl alcohol 263.7° C. and 49.95 atm and for isopropyl alcohol 235° C. and 53 atm. The drying of the gel under supercritical conditions can be carried out in accordance with the process described in U.S. Pat. No. 4,432,956, the entire disclosure of which is incorporated herein by reference. In order to effect the hydrolysis step, water is added in at least the amount stoichiometrically required to hydrolyze the alkoxide. An excess of water is advisable. To accelerate the hydrolysis, the pH of the water used may be adjusted to a pH above 7, for example by addition of some $NH_3$. Subsequently the gel is brought to the required pressure and the required temperature in an autoclave, and the heated solvent is slowly bled from the autoclave. After the supercritical drying, the palladium or other transition metal catalyst is already present in reduced form on the support. A further reduction step can optionally be carried out in a known manner, for example with hydrogen, alkali metal borohydride or hydrazine.

The palladium content is advantageously adjusted to a value of from 0.01 to 5% by weight, based on the finished supported catalyst. The palladium content is preferably from 0.01 to 4% by weight, particularly preferably from 0.1 to 2.5% by weight. These specified contents also apply to platinum, nickel, cobalt and copper.

The present invention further relates to the transition metal aerogel-supported catalysts, the transition metal being selected from the group comprising palladium, platinum, nickel, cobalt and copper, in particular the palladium aerogel-supported catalyst based on an inorganic oxide gel, which are obtainable by the process of the invention and which have a completely homogeneous distribution of the transition metal, for example of the palladium, on the support. If the support comprises inorganic oxides other than $SiO_2$, for example if a palladium aerogel-supported catalyst based on $ZrO_2$ is present, then such supported catalysts additionally contain $SiO_2$ from the chelating agent as a result of the process. This $SiO_2$ is likewise distributed completely homogeneously in the support.

The supported catalysts obtainable by the process of the invention are characterized in that the transition metal, for example the palladium, is dispersed in the support in particles which are nearly atomic in size. It is therefore assumed that the number of active sites of the aerogel-supported catalyst is greater than in other platinum, cobalt, nickel and particularly palladium aerogel-supported catalysts heretofore known from the prior art. This results in a particularly high activity of the supported catalysts produced according to the invention. Furthermore, an advantage of the process is also that the appearance of a precipitate, in particular of palladium metal, is not observed during the synthesis. This too contributes to the aforementioned particularly homogeneous distribution of the palladium metal. The fact that a chelating agent having $Si(OR^1)_3$ anchor groups is used also contributes to the aforementioned desirable dispersion of the specified metals in the resulting supported catalyst.

The supported catalysts produced by the process of the invention can be used for all those purposes for which such supported catalysts are used. For example, the palladium aerogel-supported catalyst is suitable for catalyzing hydrogenation reactions, for example for converting acetylene into ethylene using hydrogen, for converting ethylene and hydrogen into ethane, for converting benzene into cyclohexane using hydrogen, for hydrogenation of oils to solid fats, for the reduction of nitro groups, for example for the purpose of preparing aniline from nitrobenzene and hydrogen. Furthermore, the aerogel-supported catalyst of the invention is also suitable for catalyzing oxidation reactions, for example the formation of water from hydrogen and oxygen. The supported catalyst of the invention can thus, for example, also be used where hydrogen, the occurrence of which may be desired or undesired, is converted into water to prevent explosions, for example in nuclear power stations or in connection with electrolysis processes. It can also be used to decompose hydrogen peroxide. The present invention therefore further provides for the use of a palladium aerogel-supported catalyst based on an inorganic oxide gel having a homogeneous distribution of palladium, which is obtainable by the process of the invention, as a hydrogenation catalyst, for the oxidation of hydrogen and for $H_2O_2$ decomposition.

The invention will be explained in further detail by the following examples, which are merely illustrative and are not intended to limit the its scope.

EXAMPLE 1a

Preparation of a Pd/$SiO_2$ aerogel-supported catalyst containing 5% by weight Pd using a palladium and N-[3(trimethoxysilyl)propyl]-1,2-ethanediamine complex.

0.16 g (0.5 mmole) of palladium(II) acetylacetonate were dissolved in 50 ml of ethanol. 0.22 ml (1 mmole) of N-[3(trimethoxysilyl)propyl]-1,2-ethanediamine was added to the solution and the mixture was stirred at ambient temperature until the solution was clear. After half an hour a clear yellow solution was obtained, indicating that the palladium had been completely complexed. 3.59 ml (16 mmole) of tetraethoxysilane were then added to the solution. A mixture containing 1.44 ml of an aqueous ammonia solution ($NH_3$ content: 0.2 mole/l) dissolved in 10 ml of ethanol was then introduced into this solution. The resulting solution was then maintained at a temperature of 70° C. for 72 hours. The gel was subsequently dried under supercritical conditions with respect to ethanol, namely at 327° C. and 120 bar. The resulting aerogel-supported palladium catalyst obtained after the supercritical drying was in the form of a black monolith, which could be broken up before use.

EXAMPLE 1b

Preparation of Pd/$SiO_2$ aerogel-supported catalyst containing 0.12% by weight of Pd.

9.1 mg of palladium(II) acetylacetonate were dissolved in 30 ml of ethanol. 0.013 ml of N-[3(trimethoxysilyl)propyl]-1,2-ethanediamine were introduced into the solution, and the mixture was stirred at ambient temperature until a clear yellow solution was obtained.

10.75 ml of tetraethoxysilane were added to this solution. 30 ml of ethanol were mixed with 4.32 ml of an aqueous $NH_3$ solution ($NH_3$ content: 0.2 M). This mixture was combined with the solution containing the palladium complex and the silane compound, maintained at 70° C. for about 72 hours in the receptacle of the extraction apparatus and then dried under supercritical conditions as described in Example 1a.

EXAMPLE 2

Preparation of a Pd aerogel-supported catalyst based on $SiO_2$/$ZrO_2$ gel and containing 0.1% by weight of Pd.

First, three solutions I, II and III were prepared. To prepare solution I, 13.8 mg of palladium(II) acetylacetonate were dissolved in 100 ml of ethanol, 0.8 ml of N-[3(trimethoxysilyl)propyl]-1,2-ethanediamine were added thereto and the mixture was stirred at ambient temperature until a clear yellow solution was formed.

To prepare solution II, $Zr(OC_3H_7)_4$ was dissolved in methoxyethanol (glycol monomethyl ether) until a solution having a concentration of 1 mole of the zirconium compound per liter of solution had been obtained.

Solution III was prepared by mixing 5 ml of an aqueous $NH_3$ solution ($NH_3$ content: 0.2 M) with 76 ml of ethanol.

25.6 ml of the solution II were added to the solution I, then 5.4 ml of tetraethoxysilane were added. Then the solution was mixed with the solution III and maintained at 70° C. for 72 hours in the receptacle of the extraction apparatus. Subsequently, supercritical extraction was carried out as described in Example 1a. The product was an aerogel-supported catalyst based on $SiO_2$ and $ZrO_2$ in a molar ratio of 1:1 and containing 0.1% by weight of Pd.

EXAMPLE 3

Use of the palladium aerogel-supported catalysts for the combustion of $H_2$.

3a

The palladium/$SiO_2$ aerogel-supported catalyst obtained as described in Example 1a was used. The test gas used was a mixture containing 2.98% of $H_2$, 20% of $O_2$ and 77.02% of $N_2$. The diameter of the reactor used was 20 mm, the reaction was carried out at ambient pressure, the flow rate of the gas was 84 ml/min. The experimental conditions regarding the reaction temperature, the depth of the catalyst bed, the space velocity and the result obtained for 5 experiments are summarized in the following Table 1:

TABLE 1

Combustion of $H_2$/$O_2$ test gas using Pd/$SiO_2$ aerogel-supported catalyst

| Example | Temp. at Start of Reaction | Depth of Catalyst Bed | Space Velocity [s] | Result |
| --- | --- | --- | --- | --- |
| 3.1 | 64° C. | 27 mm | 6 | Total $H_2$ Oxidation |
| 3.2 | ambient | 27 mm | 6 | Substantially total $H_2$ oxidation |
| 3.3 | 2° C. | 27 mm | 6 | Substantially total $H_2$ oxidation |
| 3.4 | ambient | 7 mm | 1.6 | Substantially total $H_2$ oxidation |
| 3.5 | ambient | 1 mm | 0.2 | Substantially total $H_2$ oxidation |

It can be seen from Table 1 that the supported catalyst obtainable by the process of the invention enables substantially complete oxidation of hydrogen even at a very low temperature.

3b

The Pd/$SiO_2$ aerogel-supported catalyst prepared as described in Example 1b was used. The reaction was carried out in the same manner as Example 3a at 20° C., except that the diameter of the reactor was 4 mm, the depth of the catalyst bed was 20 mm, and the flow rate of the test gas was 100 ml/min.

While carrying out the experiment it was found that the reaction rate, which was already very high initially, rose still further with increasing reaction time. Thus, the (apparent) reaction rate r (mole $H_2$/s.g Pd) amounted to:

| | |
|---|---|
| at start of reaction | 0.32 moles $H_2$/s · g Pd |
| after 6 minutes | 0.345 moles $H_2$s · g Pd |
| after 24 minutes | 0.37 moles $H_2$/s · g Pd |
| after 34 minutes | 0.373 moles $H_2$/s · g Pd |
| after 43 minutes | 0.375 moles $H_2$/s · g Pd |
| after 150 minutes | 0.378 moles $H_2$/s · g Pd |

The reaction rate in the oxidation of $H_2$ was thus several times as high as with commercially available Pd supported catalysts.

In the examples, the production of the complex compounds is described using Pd-acetylacetonate. Other transition metal salts can likewise be used, such as transition metal salts of carboxylic acids or of inorganic acids such as haloacids or oxoacids. For example, acetates, trifluoroacetates, chlorides, bromides, iodides, nitrates, or sulfates of palladium or other transition metals could be used. Complex salts, such as bis-(benzonitrile)Pd(II)-chloride, can also be used. In each case, the corresponding transition metal salt complexed with the anchor compound is obtained. Pd(II)-acetylacetonate, Pd(II)-acetate and Pd(II)-trifluoroacetate are especially suitable.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for preparing an inorganic oxide aerogel containing at least one transition metal selected from the group consisting of palladium, platinum, nickel, cobalt and copper; said process comprising the steps of:

forming a mixture comprising an alkoxide precursor of the inorganic oxide, fan organometal compound of said at least one transition metal, and an organic solvent;

hydrolyzing said mixture with water to form a gel; and converting said gel under supercritical conditions into an aerogel; whereby said transition metal is homogeneously distributed in said aerogel;

wherein said organometal compound is a chelate complex of said at least one transition metal with a chelating agent comprising $Si(OR^1)_3$ anchor groups in which $R^1$ represents an alkyl group containing from 1 to 8 carbon atoms, said chelate complex being soluble in said organic solvent.

2. A process according to claim 1, wherein said chelate complex is a complex of $Pd^{2+}$, $Pt^{2+}$, $Ni^{2+}$, $Co^{2+}$ or $Cu^{2+}$ with a compound corresponding to the formula (I)

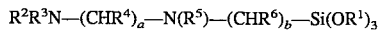

$$R^2R^3N-(CHR^4)_a-N(R^5)-(CHR^6)_b-Si(OR^1)_3 \quad (I)$$

wherein $R^1$ represents an alkyl group containing from 1 to 8 carbon atoms;

$R^2$ and $R^3$ are each independently selected from hydrogen, alkyl groups containing from 1 to 4 carbon atoms, phenyl or phenyl substituted by at least one C1 or C2 alkyl group;

$R^4$ and $R^5$ are each independently selected from hydrogen and alkyl groups containing from 1 to 4 carbon atoms;

$R^6$ represents hydrogen or an alkyl group containing from 1 to 6 carbon atoms;

a is an integer from 1 to 4; and b is an integer from 1 to 8.

3. A process according to claim 2, wherein $R^1$ is an alkyl group containing from 1 to 4 carbon atoms;

$R^2$, $R^3$, $R^4$ and R are each independently selected from hydrogen, methyl and ethyl;

$R^6$ is hydrogen or an alkyl group containing from 1 to 4 carbon atoms;

a is an integer from 1 to 3; and b is an integer from 1 to 4.

4. A process according to claim 1, wherein said mixture further comprises at least one alkoxide precursor of a base metal oxide.

5. A process according to claim 1, wherein said alkoxide precursor comprises at least one alkoxide selected from the group consisting of silicon alkoxides, aluminum alkoxides and zirconium alkoxides.

6. A process according to claim 1, wherein said organic solvent is an alcohol containing from 1 to 4 carbon atoms.

7. A process according to claim 6, wherein said organic solvent is an alcohol containing from 1 to 3 carbon atoms.

8. A process according to claim 1, wherein said transition metal is palladium, and said aerogel contains from 0.01 to 4% by weight of palladium.

9. A supported transition metal catalyst consisting of an inorganic oxide aerogel support having a transition metal selected from the group consisting of platinum, nickel cobalt and copper homogeneously distributed therein, produced by a process comprising the steps of:

forming a mixture comprising an alkoxide precursor of the inorganic oxide, a chelate complex of said at least one transition metal with a chelating agent comprising $Si(OR^1)_3$ anchor groups in which $R^1$ represents an alkyl group containing from 1 to 8 carbon atoms, and an organic solvent in which said chelate complex is soluble;

hydrolyzing said mixture with water to form a gel; and converting said gel under supercritical conditions into an aerogel.

10. A supported transition metal catalyst consisting of an inorganic oxide aerogel support having a transition metal homogeneously distributed therein, produced by a process comprising the steps of:

forming a mixture comprising an alkoxide precursor of the inorganic oxide, a chelate complex of said transition metal with a chelating agent comprising $Si(OR^1)_3$ anchor groups in which $R^1$ represents an alkyl group containing from 1 to 8 carbon atoms, and an organic solvent in which said chelate complex is soluble;

hydrolyzing said mixture with water to form a gel; and converting said gel under supercritical conditions into an aerogel;

wherein said transition metal is palladium.

\* \* \* \* \*